(No Model.)
M. S. McDONALD.
ATTACHMENT FOR PENHOLDERS.
No. 549,579. Patented Nov. 12, 1895.
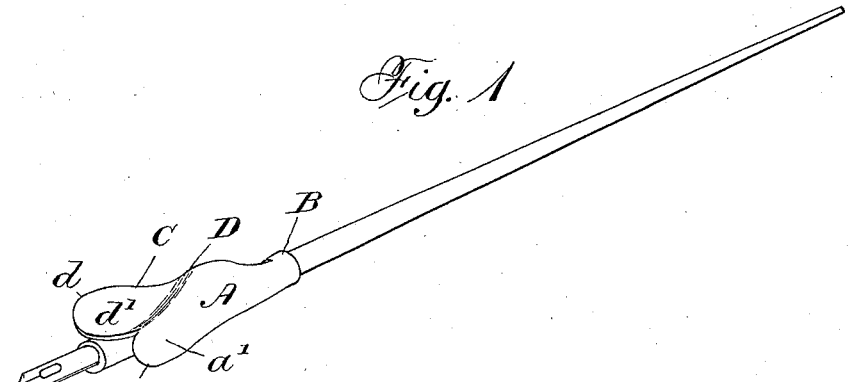
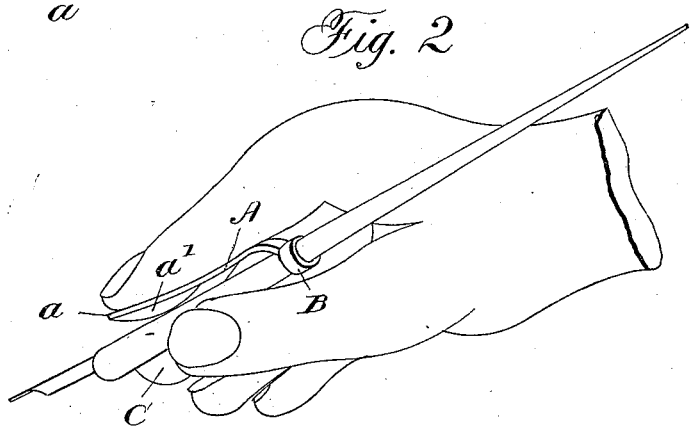
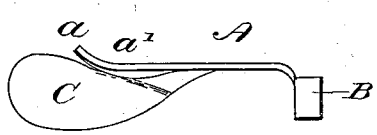
WITNESSES:
INVENTOR
Michael S. McDonald
BY
Edgar Tate & Co
ATTORNEYS

UNITED STATES PATENT OFFICE.

MICHAEL SHAW McDONALD, OF HOUSTON, TEXAS.

ATTACHMENT FOR PENHOLDERS.

SPECIFICATION forming part of Letters Patent No. 549,579, dated November 12, 1895.

Application filed September 23, 1895. Serial No. 563,337. (No model.)

*To all whom it may concern:*

Be it known that I, MICHAEL SHAW MC-DONALD, a citizen of the United States, and a resident of Houston, in the county of Harris and State of Texas, have invented certain new and useful Improvements in Attachments for Penholders, of which the following is a specification, reference being had to the accompanying drawings, forming a part thereof, in which similar letters of reference indicate corresponding parts.

This invention relates to attachments for penholders; and the object thereof is to provide a simple and effective device of this class which may be readily and easily attached to a penholder, and which is adapted to protect the fingers of the hand and prevent them from coming in contact with the pen or with the inked portion of the holder.

The invention is fully disclosed in the following specification, of which the accompanying drawings form a part, in which—

Figure 1 is a perspective view of a penholder and pen, showing, also, my improved attachment connected therewith; Fig. 2, a similar view showing the method of operation, and Fig. 3 a side view of the attachment.

In the practice of my invention I provide an attachment which is preferably composed of thin metal, but which may be composed of hard rubber or any other desired substance.

The attachment comprises a metal plate A, which is curved, as shown in Figs. 1, 2, and 3, and the outer end of which is directed upward, as shown at $a$, and provided with a concave surface or depression, as shown at $a'$.

The inner end of the plate A is provided with a ring B, which is adapted to be slipped onto or over the holder, as shown in Figs. 1 and 2, and formed on the side of the said plate is a downwardly-directed and inwardly and outwardly curved wing C, said wing being connected with the plate A at D and the end thereof being outwardly curved, as shown at $d$, and the end of which is concaved or provided with a depression at $d'$.

The wing C is projected slightly farther than the end of the plate A, and the operation will be readily understood from the foregoing description, when taken in connection with the accompanying drawings.

The ring B is slipped over the holder, as shown in Figs. 1 and 2, and the attachment is pressed forward until the ends of the wing C and the plate A are adjacent to the end of the holder, and in grasping the pen provided with my improved attachment the forefinger of the hand is placed on the plate A and the second finger on the wing C, as shown in Fig. 2, and it will thus be seen that I provide a simple and effective attachment for protecting the fingers of the hand and preventing the inking thereof.

My invention is not limited to the exact form and construction of parts shown and described, and I therefore reserve the right to make all such alterations therein and modifications thereof as fairly come within the scope of the invention.

Having fully described my invention, I claim and desire to secure by Letters Patent—

1. An attachment for pen holders, comprising a ring, through which the holder is adapted to be inserted, a plate connected therewith, the end of which is directed toward the pen, said plate being adapted to receive the forefinger of the hand, and a wing connected with said plate and extending outwardly and downwardly, and adapted to serve as a support for the second finger of the hand, substantially as shown and described.

2. An attachment for a pen holder, comprising a plate as A, having a depression in the outer end thereof, a ring as B, connected with said plate through which the pen holder is adapted to be inserted, and a wing connected with one side of said plate, and directed outwardly and downwardly, and provided with a depression in the end thereof, said plate and said wing being adapted to serve as rests for the fingers of the hand, substantially as shown and described.

In testimony that I claim the foregoing as my invention I have signed my name, in presence of the subscribing witnesses, this 16th day of September, 1895.

MICHAEL SHAW McDONALD.

Witnesses:
WALTER COLBY,
IRA P. JONES.